(No Model.)
W. H. McWHIRTER.
ANIMAL TRAP.
No. 588,167. Patented Aug. 17, 1897.
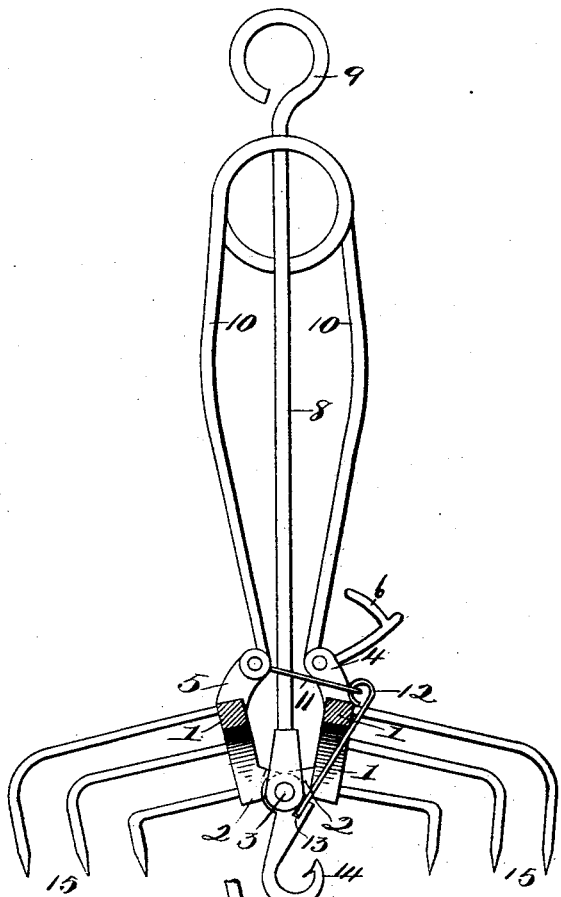
Witnesses:
Inventor
W. H. McWhirter
By John S. Duffie
Attorney

UNITED STATES PATENT OFFICE.

WILLIAM H. McWHIRTER, OF ALGOMA, MISSISSIPPI.

ANIMAL-TRAP.

SPECIFICATION forming part of Letters Patent No. 588,167, dated August 17, 1897.

Application filed February 12, 1897. Serial No. 623,141. (No model.)

*To all whom it may concern:*

Be it known that I, WILLIAM H. MCWHIRTER, a citizen of the United States, residing at Algoma, in the county of Pontotoc and State of Mississippi, have invented certain new and useful Improvements in Animal-Traps; and I do hereby declare the following to be a full, clear, and exact description of the invention, such as will enable others skilled in the art to which it appertains to make and use the same.

My invention is an animal-trap, and is an improvement on my animal-trap patented July 24, 1895, by Letters Patent No. 543,263.

The principal improvement of the present invention over the one just referred to is that the circular jaws are supplied with hinge extensions which facilitate their movements and give greater power to the springs, and the pinion rod or axle is straight, and the device for holding the trap open to set it, and the device for holding the bait and setting the trap is an improvement over the former devices for those purposes.

In the accompanying drawings, Figure 1 is a side elevation of my trap set, with the front part of the jaws cut away. For the sake of description I will call this the "front" side. Fig. 2 is a side elevation of the rear side of the trap, showing the trap locked open ready to be set, the teeth, handle, and spring being broken away.

My device is described as follows: 1 are circular jaws having hinge extensions 2. These jaws are hinged together at their ends by a rod 3. The set jaws midway between each end are provided with lever extensions 4 5, and to the lever extension 4 is pivoted a hook 6, which hooks over a lug 7 on extension 5. To the pivot-rod 3 is pivoted the lower end of a rod 8, having on its upper end a thumb-hold 9. To the extreme ends of the lever extensions is pivoted the two ends of a spring 10. To the lever extension 5 is pivoted a link 11, which extends over and to the outer edge of the lever extension 4. To the extreme end of the link 11 is hinged or hooked a trigger 12, the lower end of which fits in a slot 13 of a bait-hook 14, the upper end of which is pivoted to the rod 3. 15 are the teeth.

When I wish to set the trap, I press the rods 10 10 together, which opens the trap, as shown in Fig. 1. Then I hook the hook 6 (see Fig. 2) over the lug 7. This holds the trap open until I can set it. I then pass the link from one jaw over the other. Then I turn the trigger 12 down and slip its free end into the slot 13 of the bait-hook 14. Now the trap is set. I then bait the hook and then gently throw the hook 6 back from off the lug 7.

When an animal seizes the bait, the trap is immediately thrown and he is pierced by the teeth 15.

Having described my invention, what I claim as new, and desire to secure by Letters Patent, is—

1. The combination of the circular jaws 1, having the hinge extensions 2, and lever extensions 4, 5, and teeth 15, said jaws pivoted together by a rod 3; rod 8, pivoted to the rod 3; spring 10, pivoted to the lever extensions 4, 5; hook 6, pivoted to lever extension 4; lug 7, set in lever extension 5; link 11, pivoted to extension 5; trigger 12, hinged to link 11; bait-hook 14, pivoted to the rod 3, and having a slot 13, adapted to hold the free end of the trigger 12, substantially as shown and described and for the purposes set forth.

2. The combination of the circular jaws 1, having the hinge extensions 2, and lever extensions 4, 5, and teeth 15, said jaws pivoted together by a rod 3; rod 8, pivoted to the rod 3; spring 10, pivoted to the lever extensions 4, 5; link 11, pivoted to extension 5; trigger 12, hinged to link 11; bait-hook 14, pivoted to the rod 3, and having a slot 13, adapted to hold the free end of the trigger 12, substantially as shown and described and for the purposes set forth.

In testimony whereof I affix my signature in presence of two witnesses.

WILLIAM H. McWHIRTER.

Witnesses:
W. J. LYON,
M. I. BASS.